United States Patent [19]

Parlan et al.

[11] Patent Number: 5,787,255
[45] Date of Patent: Jul. 28, 1998

[54] INTERNETWORKING DEVICE WITH ENHANCED PROTOCOL TRANSLATION CIRCUIT

[75] Inventors: Jonathan M. Parlan, San Jose; Shashi Kumar, Fremont, both of Calif.

[73] Assignee: Cisco Systems, Inc., San Jose, Calif.

[21] Appl. No.: 631,790

[22] Filed: Apr. 12, 1996

[51] Int. Cl.$^6$ ............................................. G06F 12/00
[52] U.S. Cl. ...................... 395/200.63; 395/200.6; 395/200.61; 395/200.62; 395/200.65; 395/200.75; 395/200.79; 395/200.8; 395/200.83; 370/349; 370/353; 370/354; 370/355
[58] Field of Search .......................... 395/200.3, 800, 395/200.63, 200.46, 200.6, 200.61, 200.62, 200.65, 200.75, 200.79, 206.8, 200.83; 370/349, 353, 354, 355, 356

[56] References Cited

U.S. PATENT DOCUMENTS 5,615,328  3/1997  Hadderman et al. ............... 395/182.2
5,625,825  4/1997  Rostoker et al. ...................... 395/730
5,640,399  6/1997  Rostoker et al. ...................... 395/392
5,651,002  7/1997  Van Seters et al. .................. 370/392
5,659,715  8/1997  Wu et al. .......................... 395/497.01

*Primary Examiner*—Alyssa H. Bowler
*Assistant Examiner*—Dzung C. Nguyen
*Attorney, Agent, or Firm*—Marger, Johnson, et al.

[57] ABSTRACT

A special memory overlay circuit uses a first DRAM buffer memory in combination with a second faster SRAM buffer memory to reduce the time required to translate information into different network protocols. Packet data is stored in the DRAM buffer memory and packet headers requiring manipulation are stored in the SRAM buffer memory. Because the SRAM has a faster data access time than the DRAM buffer memory, a processor can reformat the packet header into different network protocols in a shorter amount of time. Packet headers also use a relatively small amount of memory compared to remaining packet data. Since the SRAM buffer memory is only used for storing packet headers, relatively little additional cost is required to utilize the faster SRAM memory while substantially increasing network performance.

23 Claims, 5 Drawing Sheets

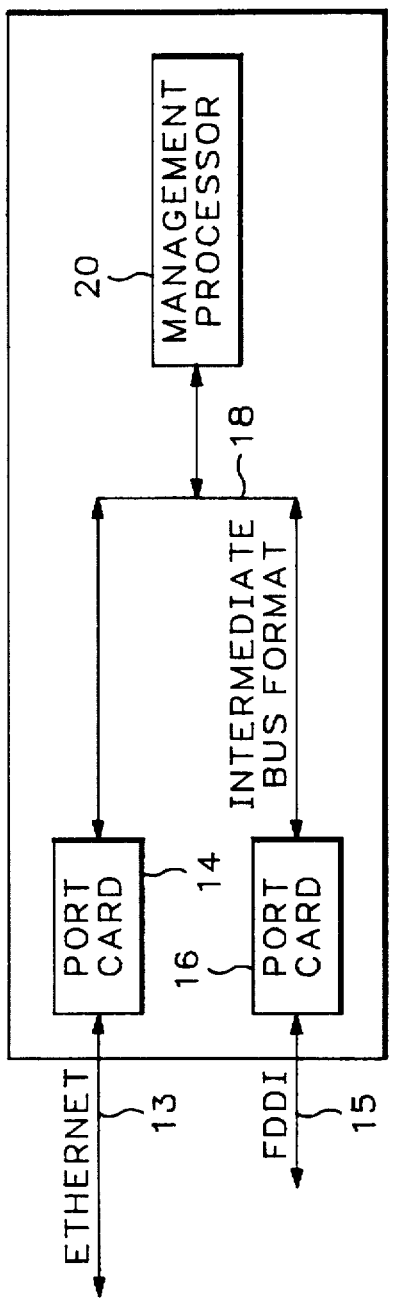
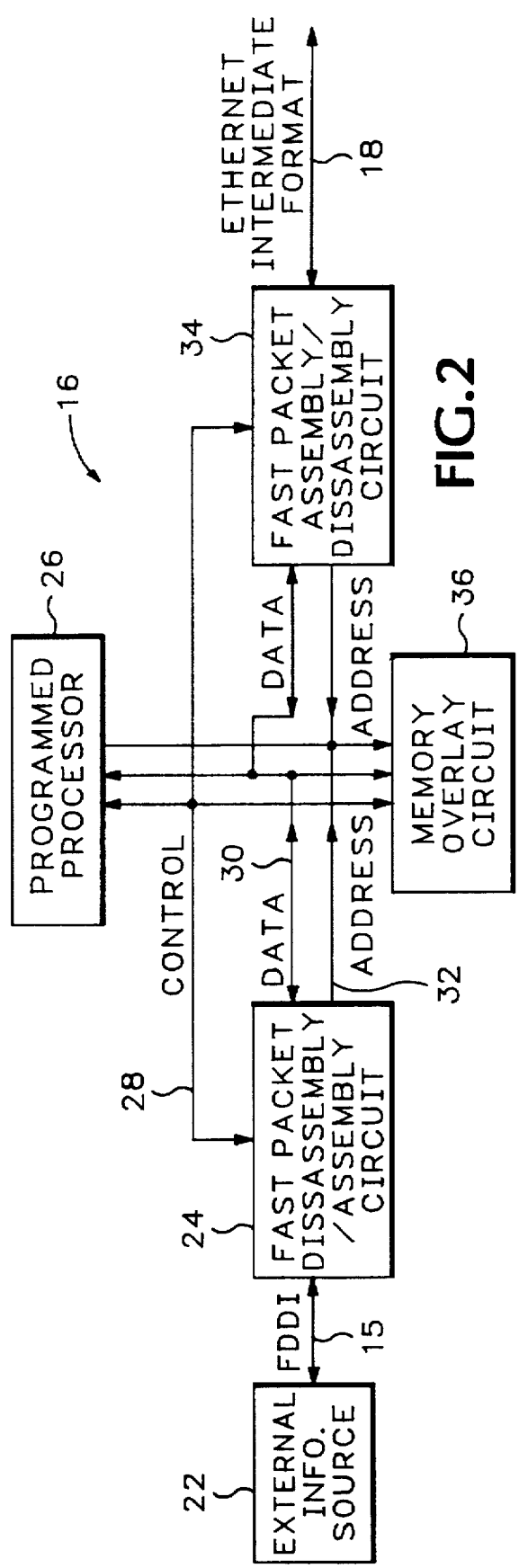

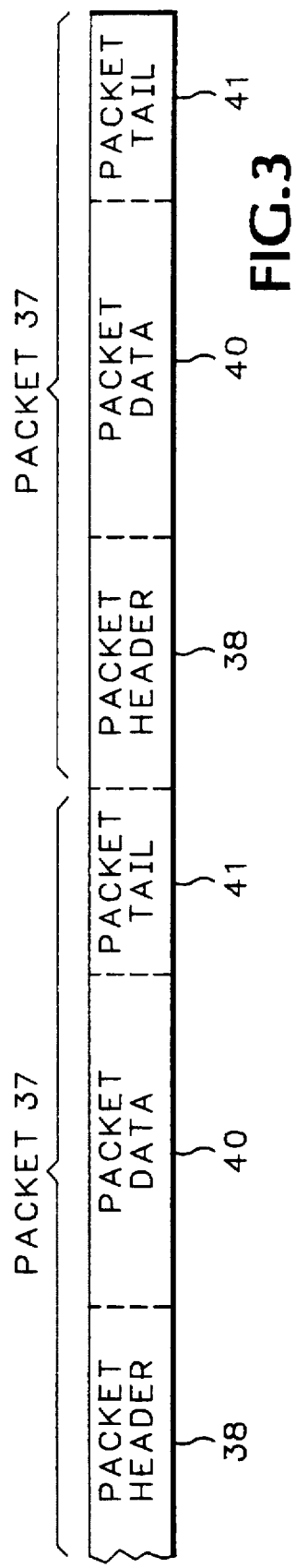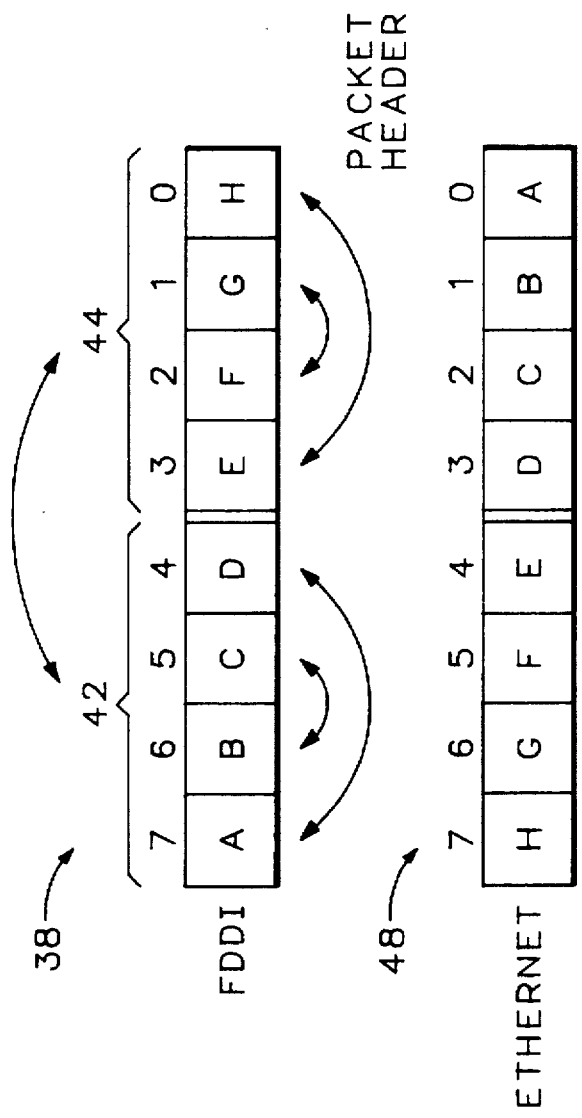

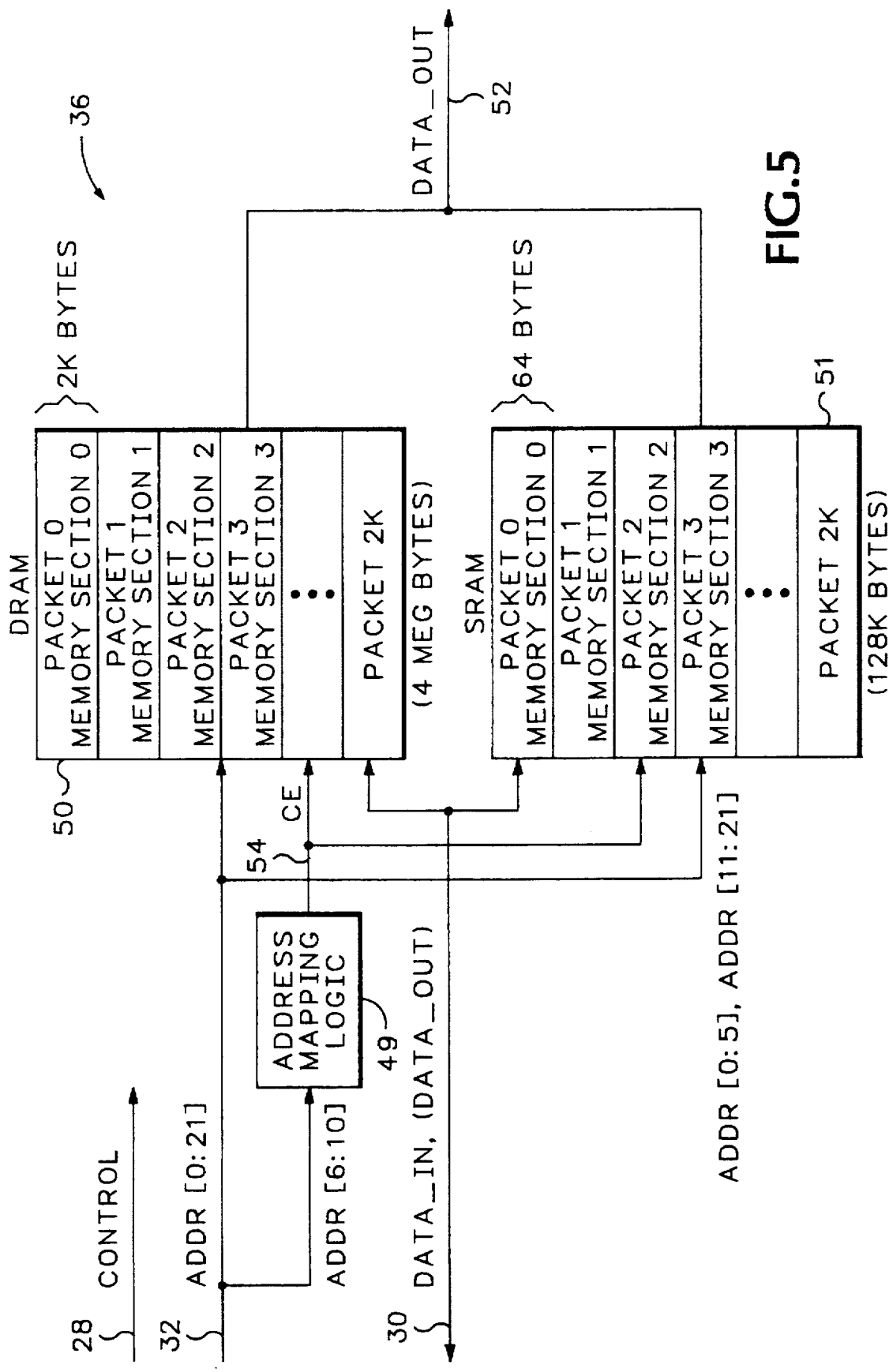

1

INTERNETWORKING DEVICE WITH ENHANCED PROTOCOL TRANSLATION CIRCUIT

FIELD OF THE INVENTION

This invention relates generally to communication networks and more particularly to a memory overlay circuit used for translating information into different network protocols.

BACKGROUND OF THE INVENTION

Different communication networks, such as Fiber Distributed Data Interface (FDDI) and Ethernet, use different communication protocols. In order to perform network transfers, information having a first network protocol must be reformatted into the protocol used in the second destination network.

Network protocols typically comprise packets which include a packet header, packet data and a packet tail. The packet header contains all necessary information for transferring the packet through the network and the packet data includes user information. The packet tail contains information such as a frame check sequence for determining whether the packet was received error-free. One method used for reformatting packets into different network protocols comprises temporarily storing the network packets into a buffer memory. A processor accesses the buffer memory in order to manipulate the packet header into the correct protocol for the destination network.

The processor must continuously access the buffer memory to manipulate the header for each packet transferred between the two networks. Increasing the buffer access speed generally reduces the amount of time required to translate a packet header into a new network protocol. Reducing packet translation time thereby increases the rate that information can be transferred between different network protocols.

Since buffer memories used in network circuitry are typically large (e.g., 4 Megabytes or larger), it is prohibitively expensive to use fast Static RAM (SRAM) devices. To reduce cost, slower Dynamic RAMs (DRAMs) are used for buffer memory. However, DRAMs have substantially slower data access times than SRAMs and, therefore, slow down network performance.

Accordingly, a need remains for improving transmission performance of intra-network communications without significantly increasing the cost or complexity of network circuitry.

SUMMARY OF THE INVENTION

A special memory overlay circuit uses a first DRAM buffer memory in combination with a second faster SRAM buffer memory to reduce the time required to translate packets into different network protocols. The overlay circuit stores all packet data in the DRAM buffer memory while storing only packet headers in the SRAM buffer memory.

Because the SRAM buffer has a faster data access time than the DRAM buffer, a processor can reformat the packet header into different network protocols in less time. Packet headers comprise a relatively small portion of a network packet compared to the associated packet data. For example, packet headers may use about 64 bytes of memory while packet data may use around 2 Kbytes or more of memory. Since SRAMs are only used for storing packet headers, only a small amount of SRAM memory is required. Therefore, packet translation time is substantially increased with little additional cost to the overall translation circuitry.

The DRAM buffer is allocated into multiple memory sections, each associated with a different packet. The SRAM buffer is allocated into the same number of memory sections, each associated with one of the DRAM memory sections. The SRAM buffer is automatically enabled for the first 64 address locations of each memory section. The DRAM buffer is enabled for remaining address locations in each memory section.

An information source outputs packets using a network protocol such as FDDI. A data assembly/disassembly circuit coupled to the information source separates the packets into individual bytes, each having an associated address. The memory overlay circuit automatically loads bytes containing portions of the packet header into the SRAM buffer and loads bytes containing portions of the packet data into the DRAM buffer. A processor reformats the packet headers stored in the SRAM buffer into the correct protocol for the destination network, such as Ethernet. A second data assembly/disassembly circuit reassembles the packet data and the reformatted packet headers into packets. The packets are then output to the destination network.

The processor is connected to the SRAM and DRAM buffers and to address mapping logic. The address mapping logic decodes address bits to determine whether a memory access is associated with packet data or a packet header. When the address indicates data is part of the packet header, the SRAM is automatically enabled by the mapping logic. When the address indicates that the data is part of the packet data, the mapping logic enables the DRAM buffer. Thus, switching between the DRAM and SRAM buffer is transparent to the processor.

The foregoing and other objects, features and advantages of the invention will become more readily apparent from the following detailed description of a preferred embodiment of the invention which proceeds with reference to the accompanying drawings.

BRIEF DESCRIPTION OF DRAWINGS

FIG. 1 is a schematic diagram of multiple port cards connected in a network switching circuit according to the invention.

FIG. 2 is a detailed diagram for one of the port cards shown in FIG. 1.

FIG. 3 is a schematic diagram showing a conventional network packet protocol.

FIG. 4 are portions of packet headers used in different network protocols.

FIG. 5 is a detailed diagram of a memory overlay circuit shown in FIG. 2.

DETAILED DESCRIPTION OF THE INVENTION

Figure 6:
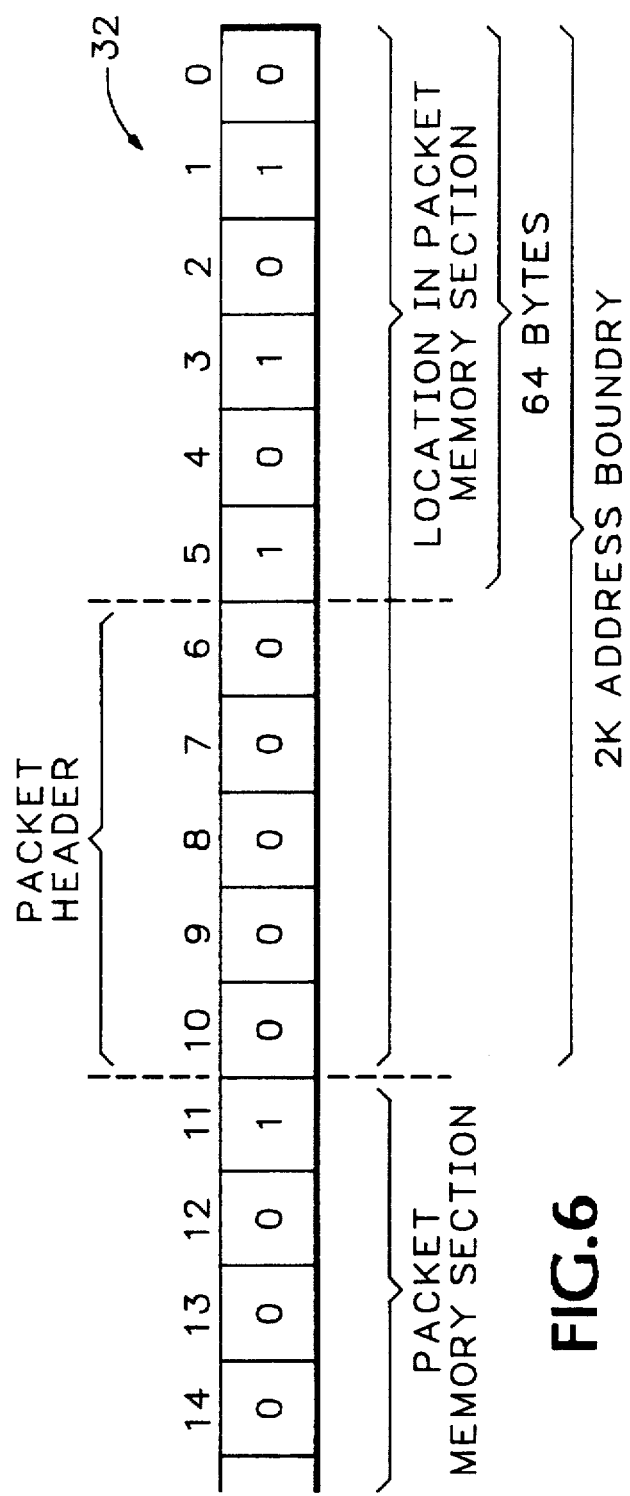
FIG. 6 is a diagram showing address mapping used in the memory overlay circuit in FIG. 5.

Referring to FIG. 1, packet translation circuitry is contained within port cards 14 and 16. Lines 13 and 15 transfer data using the same or different network protocols. For example, line 15 may transfer information formatted in a Fiber Distributed Data Interface (FDDI) network protocol and line 13 may transfer information formatted in an Ethernet protocol.

Port cards 14 and 16 are each connected to a management processor 20 by bus 18. The port cards 14 and 16 translate packets on lines 13 and 15, respectively, into an intermediate bus format. The packet data in the intermediate bus format is then translated by one of the port cards into the correct protocol for the destination network. For example, serial FDDI packets on line 15 are translated by port card 16 into an intermediate Ethernet bus format output on bus 18. The port card 14 then translates the intermediate Ethernet format into Ethernet serial traffic which is output on line 13.

The system shown in FIG. 1 can include different network configurations that come within the scope of the invention. For example, additional lines and associated port cards can be connected to additional networks such as an Asynchronous transfer Mode (ATM) network. In another embodiment of the invention, different port cards are connected to networks having the same network protocol. For example, two or more port cards are connected to different Ethernet systems. In yet another embodiment, a stand-alone port card translates information between two different serial packet protocols eliminating translation into the intermediate bus format on bus 18.

Networks such as FDDI and Ethernet transmit information at given data rates. If packet translation in port cards 14 and 16 is slow, data cannot be transferred between the networks at the maximum data rate. Therefore, reducing the amount of time required to translate packets into different network protocols increases the maximum rate at which information can be transferred between different networks.

FIG. 2 is a detailed diagram of the port card 16 shown in FIG. 1. An external information source 22 is coupled through the line 15 to a packet assembly/disassembly circuit 24. The assembly/disassembly circuit 24 is coupled by data bus 30, address bus 32 and control bus 28 to a programmed processor 26, a packet assembly/disassembly circuit 34, and of significant importance, memory overlay circuit 36. The external information source 22 represents any device that may be connected on the FDDI network such as an FDDI card in a personal computer. The information source 22 outputs packets in an FDDI format.

Referring to FIGS. 2 and 3, packets 37 are output from information source 22 (FIG. 2) and each include a packet header 38, packet data 40 and a packet tail 41. The packet header 38 contains all necessary information for transferring the packet through the FDDI network and the packet data 40 includes user information. The packet tail 41 is used for verifying the accuracy of the packet data. For simplicity, the following packet translation procedure is described in terms of only the packet header and the packet data. Storage and translation of the packet tail in the memory overlay circuit may be similar to either the packet header or packet data.

The data assembly/disassembly circuit 24 separates the packet header 38 and packet data 40 into individual bytes of information and assigns each byte an address. The bytes are temporarily stored in memory overlay circuit 36 according to the assigned address.

Processor 26 manipulates the packet headers 38 stored in memory overlay circuit 36 by changing the packet header from the initial protocol (e.g., FDDI) into an intermediate format compatible with the destination protocol (e.g., Ethernet). One example of a manipulation process conducted by processor 26 is illustrated in FIG. 4. Letters A–H represent individual bits in an eight-bit portion of the FDDI packet header 38.

The processor 26 swaps the first four most significant bits A–D with the second four least significant bits E–H. In addition, the processor 26 reverses the order of each individual bit in each four-bit section 42 and 44. The position of bit A is swapped with the position of bit D and the position of bit B is swapped with the position of bit C. Bits E–H are swapped in a similar manner to bits A–D. Packet header 48 shows the reformatted packet header now compatible with the Ethernet protocol.

Bit manipulation conducted by processor 26 varies according to the specific network formats and according to the upper level protocols associated with the network packet. However, different bit manipulation techniques each require many read and write operations between processor 26 and memory overlay circuit 36. Thus, reducing memory access time for memory overlay circuit 36 increases packet translation times in port cards 14 and 16 for many different network protocols.

The packet assembly/disassembly circuit 34 reassembles the bytes stored in memory overlay circuit 36 into an Ethernet intermediate bus protocol and outputs the data onto bus 18. In one embodiment, the circuitry inside data assembly/disassembly circuits 24 and 34 comprises a Direct Memory Access (DMA) engine with additional interface circuitry. Circuits 24 and 34 are well known to those skilled in the art and are, therefore, not described in detail.

Of significant importance to the invention is the memory overlay circuit 36 shown in detail in FIG. 5. The memory overlay circuit 36 includes a first DRAM buffer 50 and a second SRAM buffer 51 each coupled to address bus 32, data bus 30 and to address mapping logic 49 via a chip enable line 54. The DRAM 50 and SRAM 51 can be any one of a variety of commercially available random access memories that either have a common data in/data out port 30 or have a separate $data_{13}$ in bus 30 and a separate $data_{13}$ out bus 52.

The memory overlay circuit 36 stores the packet data 40 (FIG. 3) in the DRAM buffer 50 and stores the packet header 38 (FIG. 3) in SRAM 51. In the embodiment shown in FIG. 5, the DRAM is about 4 million bytes (Mbytes) and is logically separated into 2048 memory sections identified by memory sections 0–2K. Each packet memory section is 2 Kbytes. The SRAM 51 is 128 Kbytes and is logically separated into the same 2048 memory sections. Each packet memory section in the SRAM, however, is only 64 bytes. The memory sections 0–2K in DRAM 50 are each associated with a corresponding memory section 0–2K in SRAM 51.

Each memory section 0–2K is used as a buffer for storing a different network packet. For example, different portions of a first FDDI network packet 37 (FIG. 3) from circuit 24 (FIG. 2) is loaded into memory section 0 of DRAM 50 and memory section 0 of SRAM 51. Portions of the next FDDI network packet 37 output from circuit 24 is loaded into packet memory section 1 in DRAM 50 and SRAM 51.

FDDI packets can be as large as 4500 bytes. In this case, the packet is split into two or more segments each having an associated header. The two packets are placed in individual packet memory sections by the assembly/disassembly circuit 24. The processor 26 chains the two packets together as needed.

Packet headers are located in the first 64 bytes of each network packet 37. In the embodiment shown in FIG. 5, the first 64 bytes of each 2 Kbyte memory section is used for storing the packet header. Address mapping logic 49 enables SRAM 51 for any address corresponding to the first 64 bytes for any of memory sections 0–2K. Correspondingly, mapping logic 49 enables DRAM 50 for data address locations other than the first 64 bytes of each memory section.

To explain further, FIG. 6 shows bit locations for the address bus 32 shown in FIG. 5. The first 11 bits Addr[0–10] identify the location of data within a selected memory section. Bits Addr[11–21] identify which one of the 2048 memory sections is being accessed. When bits Addr[6–10] are zero, one of the first 64 address locations of a memory section are being accessed. Thus, the addressing mapping logic 49 decodes bits Addr[6–10] in order to determine when to activate SRAM 51.

When bits Addr[6–10] are zero, mapping logic 49 activates the appropriate signal on chip enable line 54 for activating SRAM 51 and, accordingly, disables DRAM 50. When bits Addr[6–10] are not all zero, the address is associated with packet data. Accordingly, mapping logic 49 enables DRAM 50 and disables SRAM 51 via chip enable line 54. Bits Addr[6–10] are masked off to SRAM 51 allowing DRAM 50 and SRAM 51 to map to corresponding packet memory sections.

Switching between SRAM 51 and DRAM 50 is transparent to circuits 24, 34 and processor 26 and any other external circuitry accessing memory overlay circuit 36. Thus, no additional circuitry or special memory addressing protocol is required by external devices when accessing the memory overlay circuit 36.

The specific packet memory configuration shown in FIG. 5 can vary according to the network protocols connected to the port card 16. For example, the specific number of memory sections, the number of bytes in each memory section and the portion of each memory section dedicated to the packet header and the packet data can vary. The memory overlay circuit shown in FIG. 5 is adaptable to different network protocols by simply changing the address mapping logic used for enabling DRAM 50 and SRAM 51.

Figure 7:
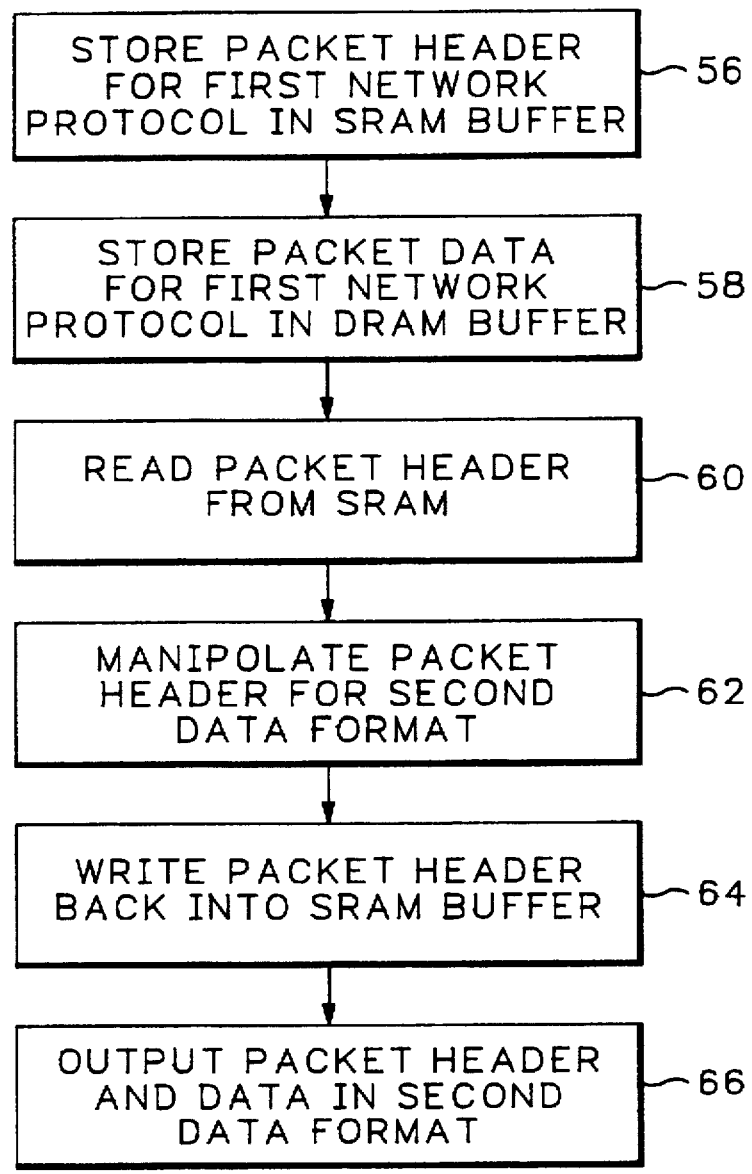
FIG. 7 is a step diagram showing a method for reformatting packets according to the invention.

FIG. 7 is a diagram showing the steps performed by the system shown in FIG. 1 in conjunction with memory overlay system 36 shown in FIG. 2. Step 56 stores packet headers for a first network protocol in the fast SRAM buffer 51. Step 58 stores packet data for the first network protocol in DRAM buffer 50.

In step 60, the processor 26 reads portions of the packet header from SRAM 51 and in step 62, the processor 26 reformats the packet header bits into a second network protocol. Step 64 writes the reformatted packet header bits back into the SRAM 51. Step 66 reassembles the pack header and packet data back into network packets and outputs the packets to the second network.

Bits are usually only manipulated in the packet headers. Using fast SRAMs to store and access the packet header, therefore, increases data throughput of the port card. In experimental tests, memory overlay circuit 36 was shown to increase the bit rate by 25% over port cards using only DRAM buffers. The SRAM is only used for storing the packet headers. Since only a small portion of each network packet is used by the packet header, only a relatively small amount of SRAM is needed. Therefore, the significant increase in port card performance is achieved at relatively little memory cost.

Having described and illustrated the principles of the invention in a preferred embodiment thereof, it should be apparent that the invention can be modified in arrangement and detail without departing from such principles. We claim all modifications and variation coming within the spirit and scope of the following claims.

We claim:

1. Memory overlay circuit used in an internetworking device for translating a network packet, comprising:
    a first memory having a first data access time;
    a second memory having a second data access time faster than the first data access time;
    an address bus coupled to both the first and second memory;
    a data bus coupled to both the first and second memory; and
    a translation circuit coupled to both the first and second memory, the translation circuit identifying a packet header solely from an address value on the address bus, enabling the first memory when the packet header is identified from the address value and storing the identified packet header in the enabled first memory using the same address value used for identifying the packet header,
    identifying packet data solely from the address value on the same address bus, enabling the second memory when packet data is identified from the address value and storing the identified packet data in the enabled second memory using the same address value identifying the packet data, and
    using the first memory to translate the packet header into different network protocols.

2. A memory overlay circuit according to claim 1 wherein the translation circuit uses the same address and data bus for identifying and storing the packet header and packet data into one of the first and second memory without using an arbitration circuit.

3. A memory overlay circuit according to claim 1 wherein the first memory comprises a dynamic random access memory (DRAM) and the second memory comprises a static random access memory (SRAM), a first group of bits in the address bus identifying different packets in the SRAM and DRAM, a second group of bits in the address identifying the header and data sections in the packets and a third group of bits in the address identifying a unique location in the header and data portions for each of the packets.

4. A memory overlay circuit according to claim 1 wherein the translation circuit exclusively stores the packet header in the first memory and exclusively stores the packet data in the second memory, the first and second memory allocated into multiple packet memory sections each combining to form a predetermined number of memory address locations, the second memory enabled by the translation circuit during a first predetermined number of the memory address locations in each one of the packet memory sections.

5. A memory overlay circuit according to claim 4 wherein the translation circuit includes a processor coupled between the address mapping logic and both the first and second memory.

6. A memory overlay circuit according to claim 1 including the following:
    an external information source that generates serial network packets in an FDDI protocol; and
    an assembly/disassembly circuit coupled between the external information source and the first and second memory, the assembly/disassembly circuit separating the serial network packets into packet segments and assigning each packet segment an associated memory address.

7. A memory overlay circuit according to claim 6 including a second assembly/disassembly circuit coupled to the first and second memory for combining packet segments stored in the first and second memory into translated network packets for an intermediate Ethernet protocol.

8. A system for translating information between communication networks, comprising:
    an information system transmitting information using a first network protocol, the information arranged in packets containing packet data and associated packet headers;

a memory overlay circuit coupled to the information system including a first high density memory buffer having a given memory access time, a second memory buffer having a faster memory access time than the first memory buffer, and mapping logic for selectively enabling one of the first and second memory buffers, the packet data entirely stored in the first memory buffer and the packet headers entirely stored in the second memory buffer;

a common address bus connected to both the first and second memory buffers and the mapping logic, the address bus providing an address value enabling one of the first and second memory buffers and a specific memory location in the enabled memory buffers;

a data bus connected to both the first and second memory buffers; and a processor coupled to the memory overlay circuit, the address bus and the data bus that translates the packet headers into a second network protocol by accessing the second memory buffer independently of the first memory buffer.

9. A system according to claim 8 wherein the memory overlay circuit is partitioned into packet memory sections each storing different packets and including a disassembly circuit coupled between the external information system and the memory overlay circuit, the assembly/disassembly circuit segmenting the packets into bytes having addresses in the packet memory sections.

10. A system according to claim 9 wherein the mapping logic decodes only a first set of bits from the address value for enabling the first and the second memory buffers in each of the packet memory sections.

11. A system according to claim 10 wherein the mapping logic enables one of said first memory buffer and second memory buffer according to a preselected block of address bits associated with the byte addresses.

12. A system according to claim 11 wherein the mapping logic masks off the preselected block of address bits in the second memory buffer.

13. A system according to claim 12 including an assembly circuit coupled to the memory overlay circuit for reassembling the packet data in the first memory buffer and the translated packet headers in the second memory buffer into packets having the second network protocol.

14. A system according to claim 13 wherein the first memory buffer comprises DRAM logically segmented into packet memory sections about 2 Kbytes long and the second memory buffer comprises SRAM logically segmented into packet memory sections about 64 bytes long.

15. A method for reformatting network packets into different network protocols, comprising:

receiving network packets having a first network protocol;

disassembling the network packets into segments and associated segment addresses identifying the packet segments as packet data or associated packet headers;

identifying a first section of the network packets and a second section of the network packets according only to the segment addresses;

selectively enabling a first high density memory buffer having a given data access time or a second memory buffer having a second data access time faster than the first high density buffer according to the segment addresses;

selectively storing the first section of the network packets in the first high density buffer and storing the second section of the network packets in the second buffer according to the segment address;

manipulating the second section of the network packets into a second network protocol by accessing the second buffer memory at the faster data access time independently of the first buffer; and reassembling the first section of the network packets in the first buffer and the second manipulated section of the network packets in the second buffer into network packets having a second network protocol.

16. A method according to claim 15 wherein the first section of the network packets comprises the packet data and the second section of the network packets comprises the packet headers.

17. A method according to claim 16 including storing each one of the network packets in separate packet memory sections in both the first and second buffer.

18. A method according to claim 17 wherein the step of disassembling the network packets comprise the following steps:

separating the network packets into individual bytes and assigning an address to each byte; and assigning bytes containing portions of packet headers to a first predetermined address space in each packet memory section and assigning bytes containing portions of packet data to a second predetermined address space in each packet memory section.

19. A method according to claim 18 wherein the step of manipulating the packet headers comprises the following steps:

swapping a first block of bits with a second block of bits; and swapping individual bits inside the first block of bits and swapping individual bits inside the second block of bits.

20. An internetworking device translating a network packet having a first protocol into a network packet having a second protocol, the internetworking device comprising:

a first memory having a first data access time;

a second memory having a second data access time faster than the first data access time;

a single bus coupled to both the first and second memory;

a disassembly circuit coupled by the single bus to the first and second memory for disassembling the network packet having the first protocol into a packet header section and packet data section;

a translation circuit for storing the packet header in the second memory, storing the packet data in the first memory, and translating the packet header into the second protocol; and an assembly circuit coupled to the first and second memory for assembling the translated packet header stored in the second memory with the packet data stored in the first memory independently of the disassembly circuit.

21. The internetworking device of claim 20 wherein the first memory comprises a dynamic random access memory DRAM and the second memory comprises a static random access memory SRAM.

22. The internetworking device of claim 21 wherein the translation circuit includes address mapping logic coupled between the bus and the first and second memory, the address mapping logic selectively enabling one of the first and second memory according to an address on the bus.

23. The networking device of claim 22 wherein the bus comprises a first bus coupled in series between the disassembly circuit and the first and second memory and including a second bus coupled in series with the first bus between the first and second memory and the assembly circuits.

* * * * *